(12) United States Patent
Naito

(10) Patent No.: US 11,194,058 B2
(45) Date of Patent: Dec. 7, 2021

(54) RADIATION IMAGING APPARATUS, RADIATION IMAGING SYSTEM, DRIVE METHOD FOR RADIATION IMAGING APPARATUS, AND NON-TRANSITORY COMPUTER-READABLE STORAGE MEDIUM

(71) Applicant: CANON KABUSHIKI KAISHA, Tokyo (JP)

(72) Inventor: Yuichi Naito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 124 days.

(21) Appl. No.: 16/394,159

(22) Filed: Apr. 25, 2019

(65) Prior Publication Data
US 2019/0250284 A1 Aug. 15, 2019

Related U.S. Application Data

(63) Continuation of application No. PCT/JP2017/033499, filed on Sep. 15, 2017.

(30) Foreign Application Priority Data

Nov. 7, 2016 (JP) .............................. JP2016-217501

(51) Int. Cl.
*G01T 1/17* (2006.01)
*H04N 5/32* (2006.01)
(Continued)

(52) U.S. Cl.
CPC .................. *G01T 1/17* (2013.01); *G01T 7/00* (2013.01); *H04N 5/32* (2013.01); *H04N 5/355* (2013.01)

(58) Field of Classification Search
CPC .. G01T 1/17; G01T 7/00; G01T 1/247; H04N 5/32; H04N 5/355
See application file for complete search history.

(56) References Cited

U.S. PATENT DOCUMENTS 6,243,441 B1 * 6/2001 Zur ........................... G01T 1/24
257/E27.146
7,431,500 B2 * 10/2008 Deych .................... A61B 6/482
378/111
(Continued)

FOREIGN PATENT DOCUMENTS

JP 2002-190983 7/2002
JP 2014-060725 4/2014
(Continued)

*Primary Examiner* — Christine S. Kim
(74) *Attorney, Agent, or Firm* — Venable LLP

(57) ABSTRACT

A radiation imaging apparatus is provided. The apparatus comprises pixels configured to detect radiation with a first sensitivity and a second sensitivity lower than the first sensitivity. Each of the pixels starts an operation for accumulating a signal with the first sensitivity in accordance with a start of irradiation of the radiation imaging apparatus with radiation, samples an accumulated signal as a first signal after lapse of a first time shorter than a period of irradiation with radiation since a start of an operation for accumulating a signal, switches to the second sensitivity, and accumulates a signal, samples an accumulated signal as a second signal in accordance with an end of irradiation of the radiation imaging apparatus with radiation, and outputs the first signal and the second signal to generate a radiation image based on the first signal and the second signal.

12 Claims, 9 Drawing Sheets

(51) Int. Cl.
*H04N 5/355* (2011.01)
*G01T 7/00* (2006.01)

(56) References Cited

U.S. PATENT DOCUMENTS

| | | | |
|---|---|---|---|
| 8,546,765 B2 | 10/2013 | Reutten et al. | |
| 9,482,628 B2 | 11/2016 | Naito et al. | |
| 9,606,246 B2 | 3/2017 | Naito | |
| 9,615,045 B2 | 4/2017 | Nishizawa | |
| 9,992,417 B2 | 6/2018 | Okura et al. | |
| 10,148,898 B2 | 12/2018 | Dowaki et al. | |
| 2004/0028182 A1* | 2/2004 | Tamegai | G01T 1/02 378/98.7 |
| 2006/0104417 A1* | 5/2006 | Kameshima | A61B 6/5235 378/98 |
| 2008/0068479 A1* | 3/2008 | Ota | H01L 27/14837 348/294 |
| 2012/0074329 A1* | 3/2012 | Granfors | H01L 27/14623 250/370.09 |
| 2012/0097856 A1* | 4/2012 | Chappo | G01T 1/2018 250/363.01 |
| 2014/0016749 A1* | 1/2014 | Oda | A61B 6/585 378/62 |
| 2014/0021365 A1* | 1/2014 | Oda | H04N 5/232411 250/395 |
| 2014/0328464 A1* | 11/2014 | Proksa | G01N 23/046 378/62 |
| 2015/0001394 A1* | 1/2015 | Yamazaki | H04N 5/32 250/336.1 |
| 2016/0269655 A1* | 9/2016 | Numata | H01L 27/14605 |
| 2016/0350923 A1* | 12/2016 | Muraoka | G06T 5/008 |
| 2017/0104940 A1* | 4/2017 | Tsukuda | H04N 5/3675 |
| 2017/0303883 A1* | 10/2017 | Kawana | A61B 6/5205 |
| 2017/0315245 A1* | 11/2017 | Yamazaki | H04N 5/3559 |
| 2018/0351570 A1* | 12/2018 | Xhakoni | H04N 5/3575 |
| 2019/0072680 A1 | 3/2019 | Naito | |

FOREIGN PATENT DOCUMENTS

| | | |
|---|---|---|
| JP | 2015-115660 | 6/2015 |
| JP | 2015-136546 | 7/2015 |
| JP | 5897752 | 3/2016 |
| WO | 2008/112058 | 9/2008 |

* cited by examiner

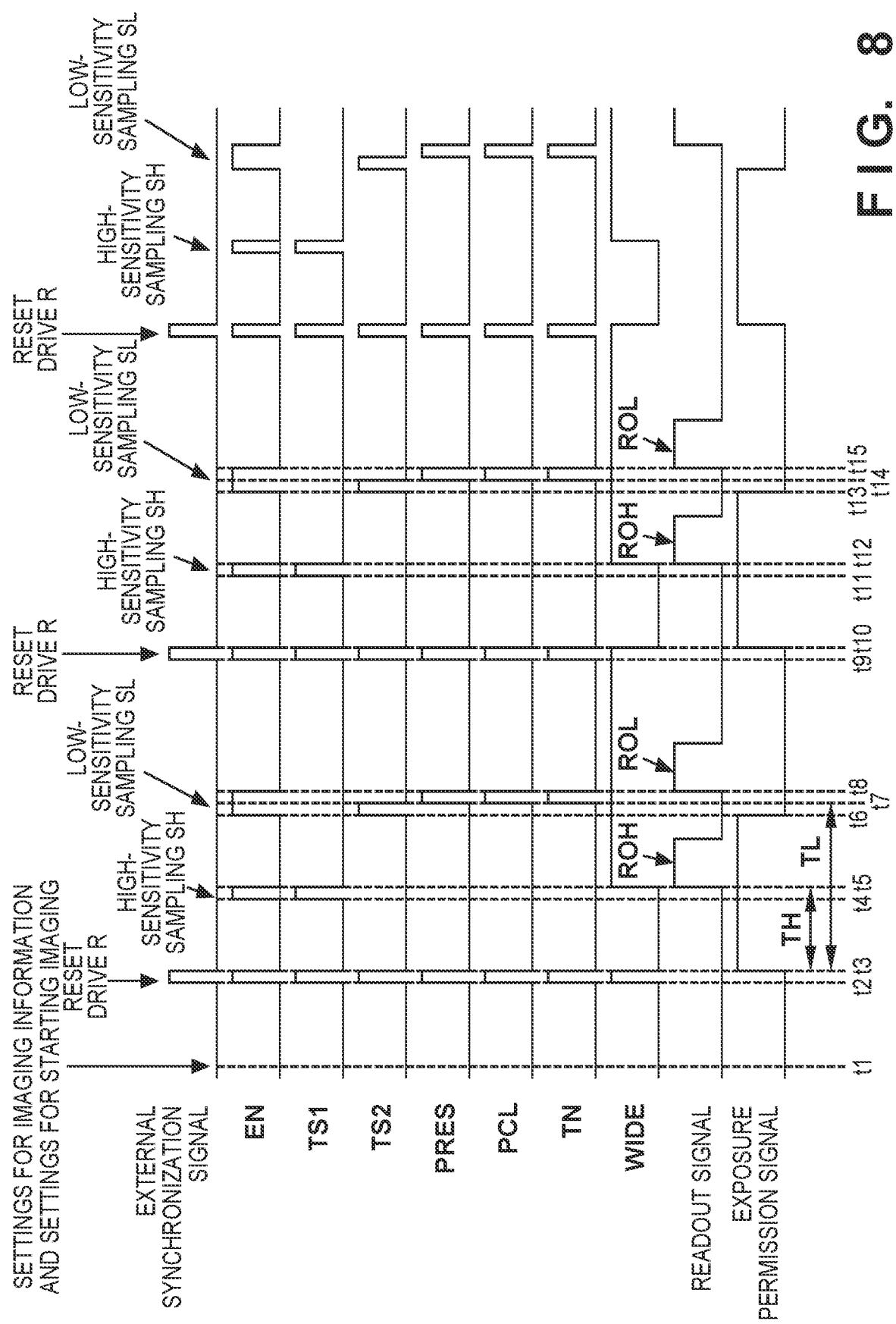

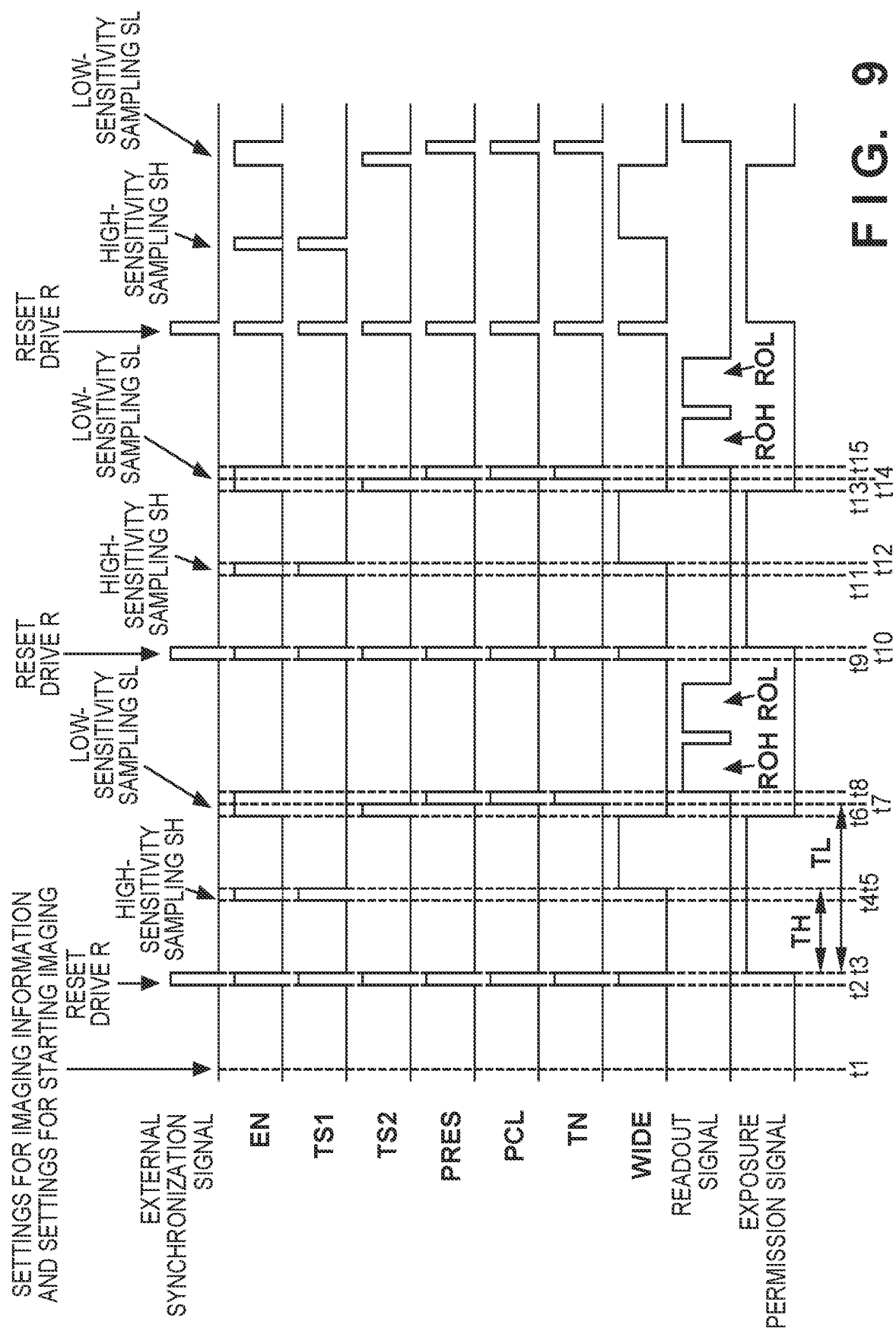

RADIATION IMAGING APPARATUS, RADIATION IMAGING SYSTEM, DRIVE METHOD FOR RADIATION IMAGING APPARATUS, AND NON-TRANSITORY COMPUTER-READABLE STORAGE MEDIUM

CROSS-REFERENCE TO RELATED APPLICATIONS

This application is a Continuation of International Patent Application No. PCT/JP2017/033499, filed Sep. 15, 2017, which claims the benefit of Japanese Patent Application No. 2016-217501, filed Nov. 7, 2016, both of which are hereby incorporated by reference herein in their entirety.

BACKGROUND OF THE INVENTION

Field of the Invention

The present invention relates to a radiation imaging apparatus, a radiation imaging system, a drive method for the radiation imaging apparatus, and a non-transitory computer-readable storage medium.

Background Art

A radiation imaging apparatus including a flat pixel panel on which pixels, each having a combination of a photoelectric conversion element and a switch element such as a TFT (thin-film transistor), are arrayed has been widely used. PTL 1 discloses an X-ray detector using the pixel capacitance of a PD (photodiode) used as a photoelectric conversion element and a low-sensitivity capacitor connected to the PD via a switch element to ensure a dynamic range. After irradiation with X-rays, first of all, electric charges accumulated in the pixel electrostatic capacitance are sampled. The switch element between the PD and the low-sensitivity capacitor is then turned on to redistribute the electric charges between the pixel capacitance and the low-sensitivity capacitor. Thereafter, sampling is performed again. It is possible to expand the dynamic range by reading out two signals in different sensitivity ranges with respect to one irradiation with X-rays.

CITATION LIST

Patent Literature

PTL 1: Japanese Patent Laid-Open No. 2014-60725

SUMMARY OF THE INVENTION

The X-ray detector disclosed in PTL 1 is configured to sample signal electric charges upon irradiation with X-rays, and hence accumulates an increasing amount of electric charges as the dose of incident radiation increases or the accumulation time increases. This may cause saturation of pixel electrostatic capacitance during irradiation with X-rays. In order to perform imaging with higher sensitivity, it is necessary to reduce the pixel electrostatic capacitance so as to ensure sensitivity to a small change in electric charge, thereby more easily leading to saturation of the pixel electrostatic capacitance. The saturation of the pixel electrostatic capacitance can cause a deterioration in the linearity of an obtained radiation image.

It is an object of the present invention to provide a technique advantageous in expanding a dynamic range in a radiation imaging apparatus.

According to some embodiments, a radiation imaging apparatus comprising a plurality of pixels configured to detect radiation with a first sensitivity and a second sensitivity lower than the first sensitivity, wherein each of the plurality of pixels starts an operation for accumulating a signal corresponding to applied radiation with the first sensitivity in accordance with a start of irradiation of the radiation imaging apparatus with radiation, samples an accumulated signal as a first signal after lapse of a first time shorter than a period of irradiation with radiation since a start of an operation for accumulating a signal, switches to the second sensitivity, and accumulates a signal corresponding to applied radiation, samples an accumulated signal as a second signal in accordance with an end of irradiation of the radiation imaging apparatus with radiation, and outputs the first signal and the second signal to generate a radiation image based on the first signal and the second signal, is provided.

According to some other embodiments, a drive method for a radiation imaging apparatus including a plurality of pixels configured to detect radiation with a first sensitivity and a second sensitivity lower than the first sensitivity, comprising: a first step of starting an operation for accumulating a signal corresponding to applied radiation in each of the plurality of pixels with the first sensitivity in accordance with a start of irradiation of the radiation imaging apparatus with radiation; a second step of sampling a signal accumulated in each of the plurality of pixels as a first signal after lapse of a first time shorter than a period of irradiation with radiation since a start of an operation for accumulating a signal, switching each of the plurality of pixels to the second sensitivity, and accumulating a signal corresponding to applied radiation; a third step of sampling a signal accumulated in each of the plurality of pixels as a second signal in accordance with an end of irradiation of the radiation imaging apparatus with radiation; and a fourth step of outputting the first signal and the second signal from each of the plurality of pixels to generate a radiation image based on the first signal and the second signal, is provided.

According to still other embodiments, a non-transitory computer-readable storage medium storing a program for causing a computer to execute a drive method for a radiation imaging apparatus including a plurality of pixels configured to detect radiation with a first sensitivity and a second sensitivity lower than the first sensitivity, comprising: a first step of starting an operation for accumulating a signal corresponding to applied radiation in each of the plurality of pixels with the first sensitivity in accordance with a start of irradiation of the radiation imaging apparatus with radiation; a second step of sampling a signal accumulated in each of the plurality of pixels as a first signal after lapse of a first time shorter than a period of irradiation with radiation since a start of an operation for accumulating a signal, switching each of the plurality of pixels to the second sensitivity, and accumulating a signal corresponding to applied radiation; a third step of sampling a signal accumulated in each of the plurality of pixels as a second signal in accordance with an end of irradiation of the radiation imaging apparatus with radiation; and a fourth step of outputting the first signal and the second signal from each of the plurality of pixels to generate a radiation image based on the first signal and the second signal, is provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a timing chart showing an example of the drive control of the imaging apparatus in FIG. 1; and FIG. 9 is a timing chart showing an example of the drive control of the imaging apparatus in FIG. 1.

DESCRIPTION OF THE EMBODIMENTS

Concrete embodiments of a radiation imaging apparatus according to the present invention will be described with reference to the accompanying drawings. Note that radiation according to the present invention can include not only α-rays, β-rays, and γ-rays that are beams generated by particles (including photons) emitted by radioactive decay but also beams having energy equal to or higher than the energy of these beams, for example, X-rays, particle beams, and cosmic rays.

Figure 1:
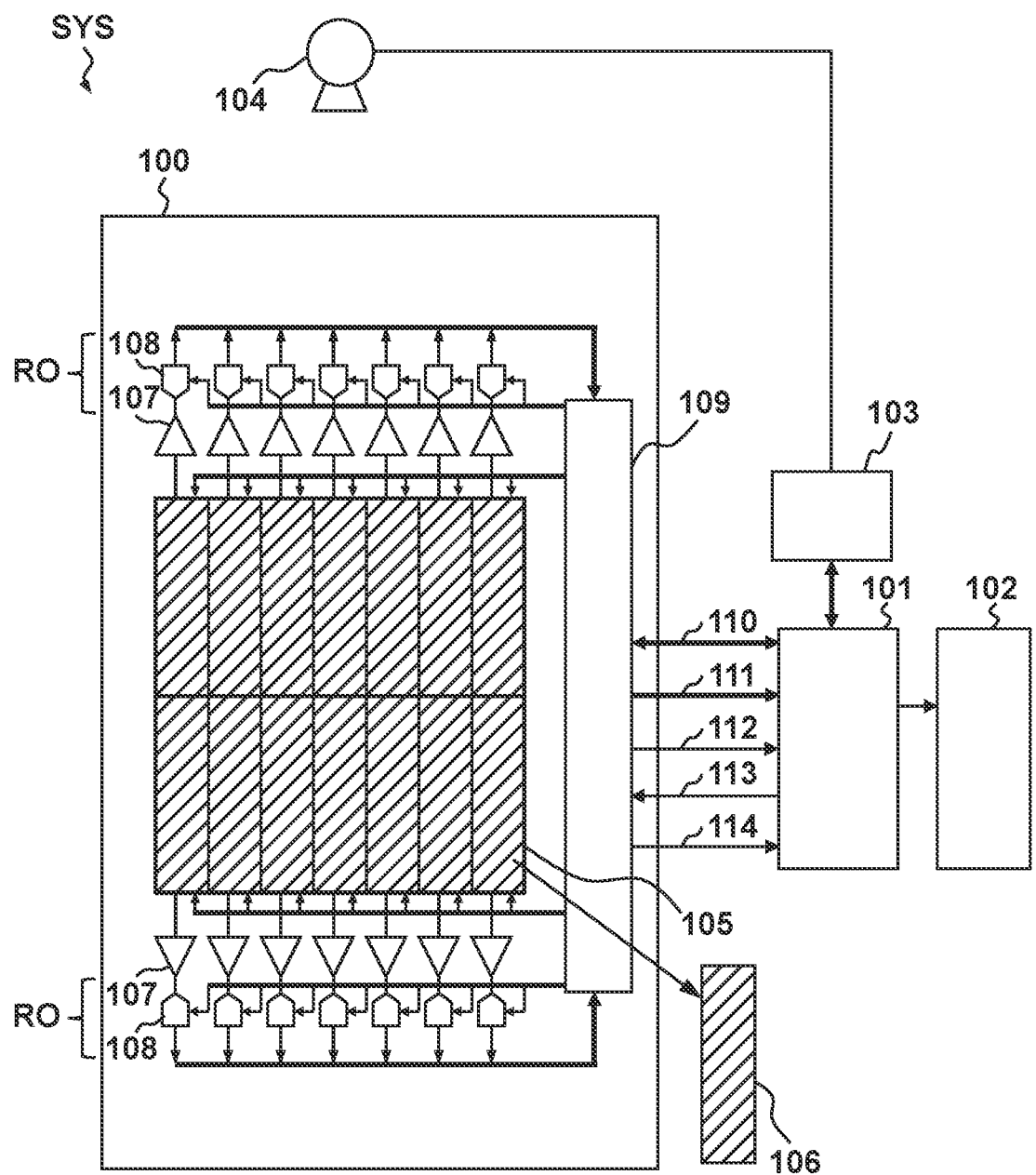
FIG. 1 is a block diagram showing an example of the system arrangement of an imaging apparatus according to an embodiment of the present invention.

The arrangement of a radiation imaging apparatus and a drive method according to an embodiment of the present invention will be described with reference to FIGS. 1 to 6. FIG. 1 is a system block diagram showing an example of the overall arrangement of a radiation imaging system SYS including a radiation imaging apparatus 100 according to a first embodiment of the present invention. The radiation imaging system SYS includes the radiation imaging apparatus 100, a system control unit 101, a display unit 102, an irradiation control unit 103, and a radiation source 104.

The radiation imaging apparatus 100 acquires image data representing the internal information of an object by radiation imaging, and outputs the image data to the system control unit 101. The system control unit 101 functions as a processing unit that performs image processing and data processing for the image data output from the radiation imaging apparatus 100. The system control unit 101 also has a function as a control unit that exchanges control signals among the respective units and performs system control and synchronization control for the overall radiation imaging system SYS including the radiation imaging apparatus 100 and the irradiation control unit 103. The display unit 102 includes, for example, a display, and displays radiation images based on the image data output from the radiation imaging apparatus 100 via the system control unit 101. For example, frame image data corresponding to irradiation with radiation is transferred from the radiation imaging apparatus 100 to the system control unit 101. The system control unit 101 performs image processing for the frame image data. The display unit 102 then displays a radiation image in real time.

The system control unit 101 controls the irradiation control unit 103 so as to synchronize it with the radiation imaging apparatus 100 at the time of radiation imaging. The irradiation control unit 103 outputs a signal for irradiation with radiation to the radiation source 104 as a radiation generator in accordance with the control signal output from the system control unit 101. The radiation source 104 generates radiation for radiation imaging in accordance with the signal output from the irradiation control unit 103. In other words, the system control unit 101 outputs, via the irradiation control unit 103, a signal for controlling irradiation with radiation to the radiation source 104 for irradiating the radiation imaging apparatus 100 of the radiation imaging apparatus with radiation.

The radiation imaging apparatus 100 includes a sensor panel 105, readout units RO, and a control unit 109. The readout units RO read out the image signals output from the sensor panel 105. The control unit 109 controls each unit in the radiation imaging apparatus 100 while exchanging signals such as control signals with the system control unit 101.

A plurality of sensor units 106 are arrayed on the sensor panel 105. Each sensor unit 106 is a sensor chip that is manufactured by a known semiconductor manufacturing process using a semiconductor substrate such as a silicon wafer and has an two-dimensional array of pixels that are CMOS type image sensors. Each sensor unit 106 has an imaging region for acquiring an image signal representing internal information of an object. In addition, each sensor unit 106 may have a light-shielded optical black region in addition to the imaging region. Each sensor unit 106 can be the one that is physically separated by dicing or the like. In other words, the plurality of sensor units 106 arrayed on the sensor panel 105 each can have a separable arrangement. Tiling the plurality of sensor units 106 on a plate-like base (not shown) can increase the size of the sensor panel 105. The respective sensor units 106 are tiled such that the conversion elements of the pixels formed in the sensor units 106 are arrayed on both sides of the boundaries between the adjacent sensor units 106 at similar pitch to that of the interior portions of the sensor units 106. For the sake of descriptive convenience, in the arrangement shown in FIG. 1, the sensor units 106 are tiled in 2 rows×7 columns. However, the arrangement of the sensor panel 105 is not limited to this arrangement.

For example, a scintillator (not shown) for converting radiation into light is arranged on the incident surface side of the sensor panel 105 which is irradiated with radiation, and electrical signals corresponding to light converted from radiation are obtained by the pixels arrayed on the respective sensor units of the sensor panel 105. Although this embodiment will exemplify the arrangement of an imaging apparatus using pixels including indirect type conversion elements for converting radiation into light via a scintillator and photoelectrically converting the converted light, it is possible to use an imaging apparatus using direct type conversion elements for directly converting radiation into electrical signals.

Each readout unit RO includes, for example, differential amplifiers 107 and A/D converters 108 for performing analog/digital (A/D) conversion. The arrangements and operations of the differential amplifiers 107 and the A/D converters 108 will be described later.

The upper side portion and lower side portion of the sensor panel 105 are provided with electrodes for exchanging signals or supplying power. The electrodes are connected to external circuits via a flying lead type printed wiring board (not shown). For example, the readout units RO read out image signals from the sensor panel 105 via the electrodes. Control signals from the control unit 109 are supplied to the sensor panel 105 via the electrodes.

The control unit 109 controls the operations of the sensor panel 105, the differential amplifiers 107, and the A/D converters 108 to perform, for example, settings for a reference voltage supplied to each sensor unit 106, drive control of each element, and operation mode control. In addition, the control unit 109 generates one frame data for each unit period by using image signals (digital data) A/D-converted by the A/D converters 108 of the readout units and output from the respective sensors of the sensor panel 105. The generated frame data is output as image data to the system control unit 101.

The control unit 109 and the system control unit 101 exchange control signals such as control commands and image data via various types of interfaces. A control interface 110 is an interface for the exchange of imaging information and setting information such as drive modes and various types of parameters. The control interface 110 may exchange apparatus information such as the operation state of the radiation imaging apparatus 100. An image data interface 111 is an interface for outputting image data based on the image signal output from the radiation imaging apparatus 100 to the system control unit 101. The control unit 109 notifies the system control unit 101 that the radiation imaging apparatus 100 is set in the imaging enabled state by using a READY signal 112. The system control unit 101 notifies the control unit 109 of the timing of the start of irradiation with radiation (exposure) by using a synchronization signal 113 in accordance with the READY signal 112 output from the control unit 109. The system control unit 101 outputs a control signal to the irradiation control unit 103 to start irradiation with radiation while an exposure permission signal 114 output from the control unit 109 is enabled.

The above arrangement is configured to perform control of each unit, for example, drive control, synchronization control, and drive mode control in the radiation imaging system SYS. For example, an input unit (not shown) such as an information input unit or information input terminal that allows the user to input imaging information such as operation modes and various types of parameters may be connected to the system control unit 101. Each unit is controlled based on imaging information input by the user. For example, the system control unit 101 functions as a drive mode setting unit to select a drive mode based on the imaging information input by the user, and controls the overall radiation imaging system SYS so as to cause the radiation imaging system SYS to operate. The radiation imaging apparatus 100 then generates frame data for each unit period based on an image signal from each pixel read out from the sensor panel 105 and outputs the frame data as image data based on the image signal to the system control unit 101. The system control unit 101 performs predetermined image processing and data processing for the image data, and causes the display unit 102 to display a radiation image based on the image data.

Each unit of the radiation imaging system SYS is not limited to the above arrangement, and the arrangement of each unit may be changed as needed in accordance with a purpose or the like. For example, the functions of two or more units such as the system control unit 101 and the irradiation control unit 103 may be implemented by one unit. In addition, for example, in this embodiment, the radiation imaging apparatus 100 and the system control unit 101 are exemplified as discrete units. However, this is not exhaustive. The radiation imaging apparatus 100 may include some or all of the functions of the system control unit 101, the display unit 102, and the irradiation control unit 103 in addition to the existing functions of the radiation imaging apparatus 100. Part of the function of a given unit may be implemented by another unit. For example, the radiation imaging apparatus 100 may include the function of a processing unit for performing image processing of the system control unit 101. Alternatively, different functions of each unit may be implemented by different units. For example, the function of a processing unit for performing image processing and the function of a control unit for performing system control of the system control unit 101 may be respectively implemented by different units.

Figure 2:
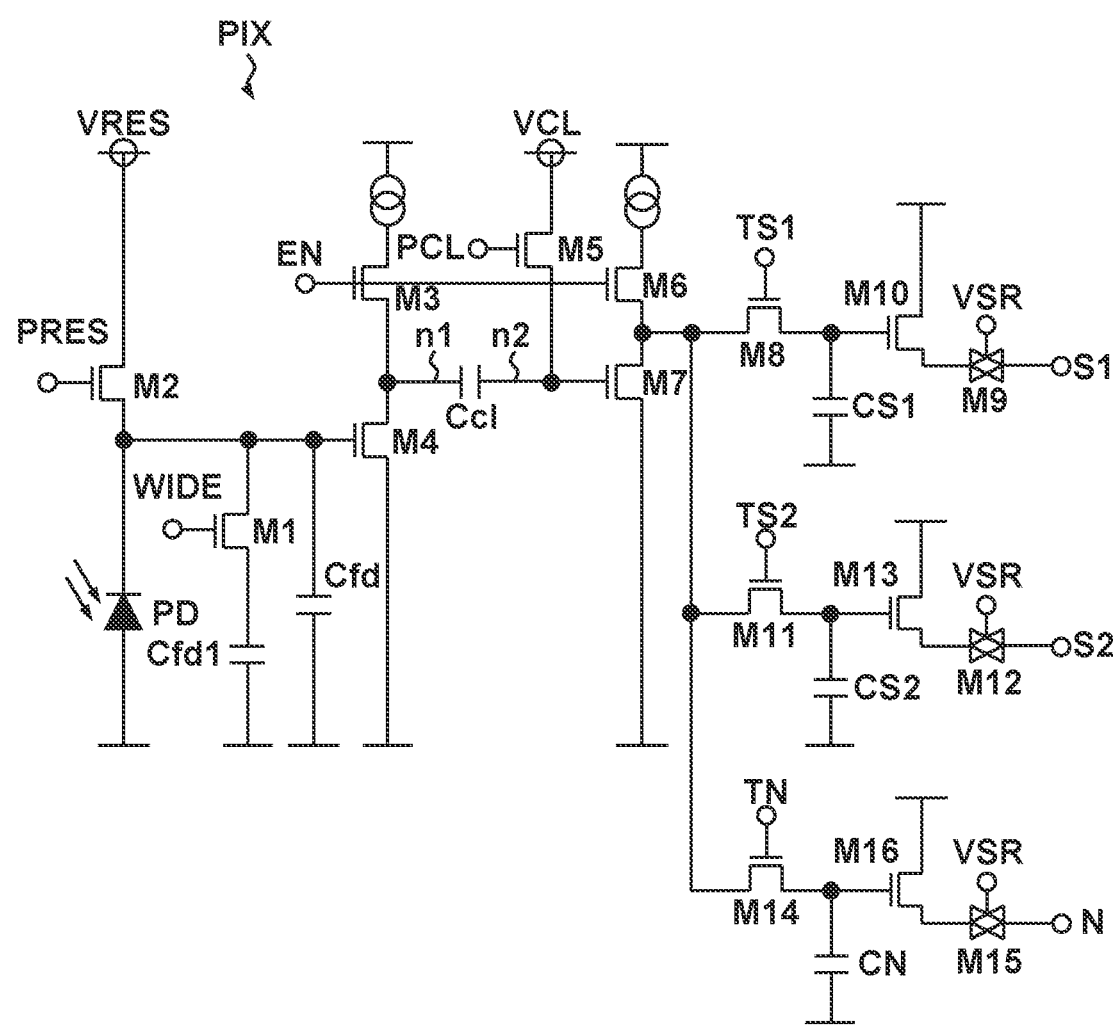
FIG. 2 is a circuit diagram showing an example of the arrangement of the pixels of the imaging apparatus in FIG. 1.

FIG. 2 shows an example of the circuit arrangement of one pixel PIX provided in each sensor unit 106 of the sensor panel 105. Referring to FIG. 2, a photodiode PD is a photoelectric conversion element, which converts light generated by the above scintillator in accordance with incident radiation into an electrical signal. More specifically, the photodiode PD generates the amount of electric charges corresponding to the amount of light generated by the scintillator. This embodiment has exemplified the arrangement using the photodiode PD as a detection element for detecting radiation, assuming the use of the sensor panel 105 using indirect type conversion elements as described above. However, this is not exhaustive. For example, direct type conversion elements for directly converting radiation into electrical signals may be used as detection elements for detecting radiation.

A capacitance Cfd is the capacitance of a floating diffusion region for accumulating the electric charges generated by the photodiode PD. The capacitance Cfd can include a parasitic capacitance parasitizing the photodiode PD. A transistor M1 is a switching element for switching the sensitivity of the pixel PIX with respect to radiation. A capacitance Cfd1 is an additional capacitance for switching the sensitivity of the pixel PIX, and is connected to the photodiode PD via the transistor M1. With this arrangement, in each pixel PIX, it is possible to change the capacitance value of the capacitance for accumulating the electric charges generated by the photodiode PD, thus switching the sensitivity of the pixel PIX with respect to radiation.

A transistor M2 is a reset switch for discharging the electric charges accumulated in the photodiode PD, the capacitance Cfd, and the capacitance Cfd1. A transistor M4 is an amplification MOS transistor (pixel amplifier) operating as a source follower. A transistor M3 is a selection switch for rendering the transistor M4 operative.

A clamp circuit for removing kTC noise generated in a photoelectric conversion unit including the photodiode PD is arranged on the subsequent stage of the transistor M4. A capacitance Ccl is a clamp capacitance. A transistor M5 is a clamp switch for clamping. A transistor M7 is an amplification MOS transistor (pixel amplifier) operating as a source follower. A transistor M6 is a selection switch for rendering the transistor M7 operative.

A holding unit provided with three sample/hold circuits is provided on the subsequent stage of the transistor M7. Transistor M8 and M11 are sample/hold switches constituting a sample/hold circuit for accumulating an optical signal that is an image signal generated by light converted from radiation. A capacitance CS1 and a capacitance CS2 are optical signal holding capacitances. A transistor M14 is a sample/hold switch constituting a sample/hold circuit for accumulating a reference voltage signal. The capacitor CN is a reference signal holding capacitance. Transistors M10 and M13 each are an amplification MOS transistor (pixel amplifier) for an optical signal, which operates as a source follower. Analog switches M9 and M12 are transfer switches for outputting the optical signals amplified by the transistors M10 and M13 to optical signal output units S1 and S2. A transistor M16 is an amplification MOS transistor for a reference signal, which operates as a source follower. An analog switch M15 is a transfer switch for outputting a reference signal amplified by the transistor M16 to a reference signal output unit N.

A signal EN is a control signal that is connected to the gates of the transistors M3 and M6 to control the operation states of the transistors M4 and M7. When the signal EN is set at high level, the transistors M4 and M7 are simultaneous rendered operative. A signal PRES is a control signal (reset signal) that is connected to the gate of the transistor M2 to control the operation state of the transistor M2. When the signal PRES is set at high level, the transistor M2 is turned on to discharge the electric charges accumulated in the photodiode PD and the capacitances Cfd and Cfd1. A signal PCL is a control signal that is connected to the gate of the transistor M5 to control the transistor M5. When the signal PCL is set at high level, the transistor M5 is turned on to set the capacitance Ccl at a reference voltage VCL. A signal TS1 is a control signal that is connected to the gate of the transistor M8 to control sampling/holding of an optical signal. The signal TS1 is set at high level to turn on the transistor M8 so as to collectively transfer an optical signal to the capacitance CS1 via the transistor M7. In all the pixels PIX, the signals TS1 are collectively set at low level to turn off the transistors M8 so as to complete sampling of optical signals to the capacitances CS1 of the sample/hold circuits. A signal TS2 is connected to the gate of the transistor M11 and operates in similar manner to the signal TS1, thereby sampling an optical signal to the capacitance CS2 of the sample/hold circuit. A signal TN is a control signal that is connected to the gate of the transistor M14 to control sampling/holding of a reference signal. When the signals TN are set at high level to turn on the transistors M14, reference signals are collectively transferred to capacitances CN via the transistors M7. In all the pixels, the signals TN are set at low level to turn off the transistors M14 so as to complete sampling of reference signals to the capacitances CN of the sample/hold circuits. After sampling/holding to the capacitances CS1, CS2, and CN, the transistors M8, M11, and M14 are turned off, and the capacitances CS1, CS2, and CN are disconnected from accumulation circuits on the preceding stage. Accordingly, optical signals and reference signals accumulated before next sampling can be nondestructively read out by rendering the respective analog switches M9, M12, and M15 conductive. That is, while the transistors M8, M11, and M14 are rendered non-conductive, held optical signals and reference signals can be read out at arbitrary timings.

Figure 3:
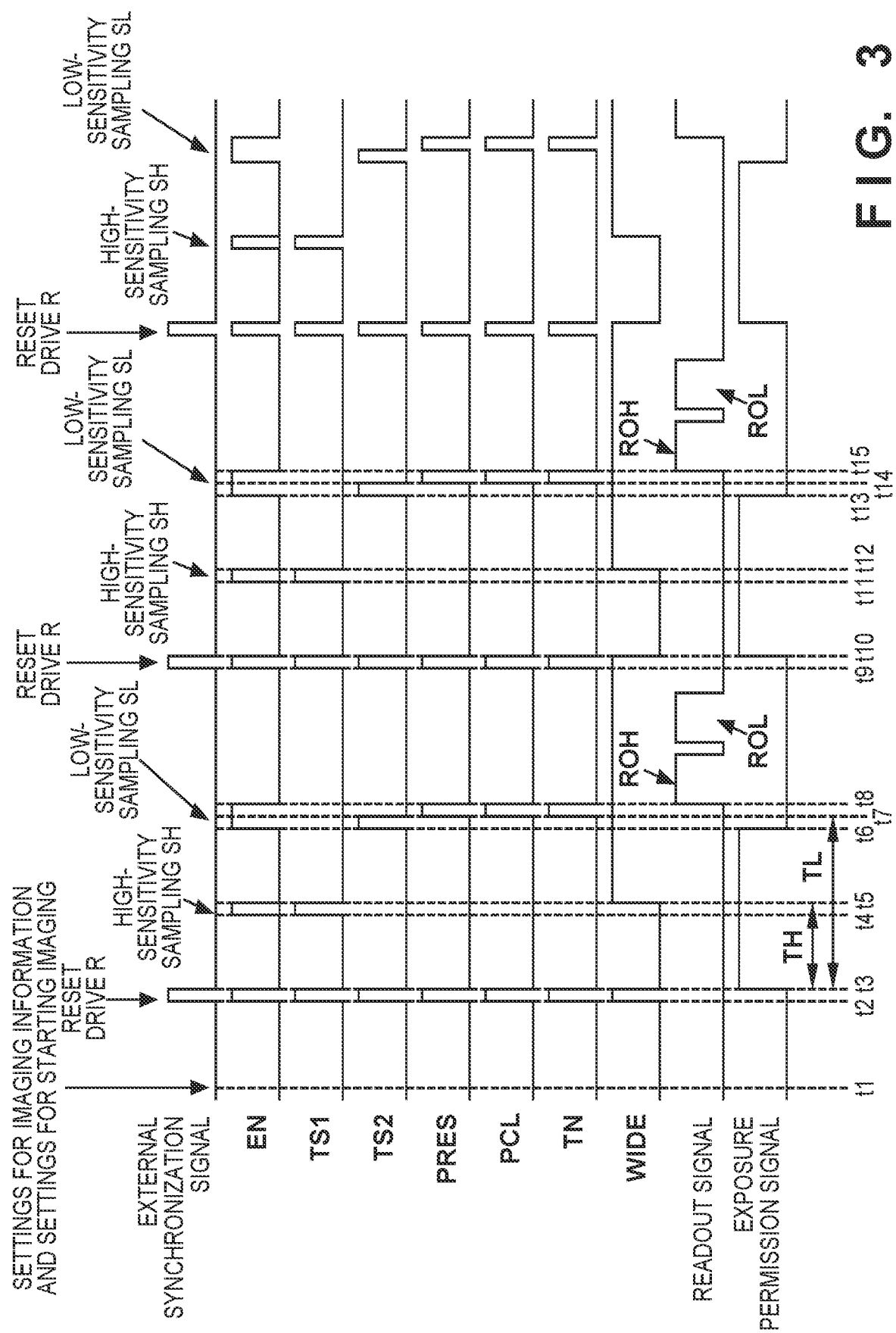
FIG. 3 is a timing chart showing an example of the drive control of the imaging apparatus in FIG. 1.

FIG. 3 is a timing chart showing an example of a drive operation of obtaining a moving image in the radiation imaging apparatus in which the pixels PIX each shown in FIG. 2 are arrayed, when the dynamic range is to be expanded and there is a limitation on the irradiation time of radiation per frame at a fixed frame rate. The timings of control signals will be described with reference to FIG. 3, in obtaining a moving image, in the period from the start of the operation of the pixel PIX to sampling of electric charges in the capacitances CS1 and CS2 as optical signal holding capacitances and the capacitance CN as a reference signal holding capacitance.

First of all, at time t1, settings are made concerning drive modes such as a moving image obtaining mode and a still image obtaining mode, imaging information such as various types of parameters including sensitivities, accumulation times, and irradiation times of radiation, and the start of imaging. When setting imaging information, the user may input a drive mode and various types of parameters one by one. Alternatively, in setting imaging information, the system control unit 101 may include a memory storing a plurality of imaging conditions, and the user may set imaging information by selecting conditions from the plurality of imaging conditions as needed.

Subsequently, drive for imaging is started from time t2. Reset drive R starting from time t2 will be described. Reset drive R is the drive operation of resetting and clamping each pixel PIX. First of all, at time t2, when the control unit 109 detects that the synchronization signal 113 from the system control unit 101 is set at high level, the signal EN is set at high level to turn on the transistor M4 as a pixel amplifier and the transistor M7 as a pixel amplifier. While a signal WIDE and a signal PRES are then set at high level to turn on the transistor M1 to switch sensitivities, the photodiode PD is connected to the reference voltage VRES. The signal PCL is then set at high level to turn on the transistor M5 as a clamp switch, and the reference voltage VCL is connected to the transistor M7 side of the capacitance Ccl as a clamp capacitance. At the same time, the signals TS1, TS2, and TN are set at high level to turn on the transistors M8, M11, and M14.

At time t3, the signal WIDE is set at low level to turn off the transistor M1 so as to switch to the mode of detecting radiation with the high sensitivity of the pixel PIX. In addition, the signal PRES is set at low level to finish resetting, and a reset voltage is set on the transistor M4 side of the capacitance Ccl. In addition, the transistor M1 side of the capacitance Cfd1 is also held at the reset voltage to prevent the occurrence of an unstable voltage. The transistor M5 is then turned off to accumulate electric charges corresponding to the differential voltage between the reference voltage VCL and the reference voltage VRES are accumulated in the capacitance Ccl, thereby finishing clamping. At the same time, the transistors M8, M11, and M14 are turned off to sample/hold the reference signal obtained when the reference voltage VCL is set in the capacitances CS1, CS2, and CN. The influence of an after image is reduced by uniforming electric charges in the capacitances CS1 and CS2 for sampling optical signals and the capacitance CN for sampling a reference signal before sampling.

At time t3, reset drive R is finished, and the pixel PIX is set in an accumulating state. Accordingly, the control unit 109 enables the exposure permission signal 114 to issue a request to perform irradiation with radiation. Time t3 can be regarded as a time to start accumulating signals (electric charges) corresponding to applied radiation for each pixel. The accumulation of electric charges in the photodiode PD and the capacitance Cfd of the floating diffusion region is started in accordance with the start of irradiation with radiation by enabling the exposure permission signal 114. That is, the accumulation of signals corresponding to applied radiation with high sensitivity is started from time t3. In addition, the signal EN is set at low level, and the transistors M4 and M7 constituting the pixel amplifier are rendered inoperative.

Reset drive R is collectively performed for the pixels PIX arranged in the radiation imaging apparatus 100. Subsequent reset drive R is also controlled at similar timings. In performing imaging for moving images or still images, in order to prevent image shifts caused by temporal switching shifts between pixels and scanning lines, reset drive R can be performed for all the pixels PIX arranged in the radiation imaging apparatus 100 at the same timing in the same period. Thereafter, electric charges are accumulated by irradiation with radiation, and the electric charges generated in the photodiode PD of each pixel PIX are accumulated in the capacitance Cfd and the parasitic capacitance of the photodiode PD.

High-sensitivity sampling drive SH starting from time t4 will be described next. At time t4, the signal EN is set at high level to turn on the transistors M3 and M6. With this operation, the electric charges accumulated in the capacitance Cfd are charge/voltage-converted and output as a voltage to the capacitance Ccl by the transistor M4 operating as a source follower and constituting the pixel amplifier. Although an output from the transistor M4 contains reset noise, because the clamp circuit sets the transistor M7 side at the reference voltage VCL at the time of reset drive R, the output is output as an optical signal from which reset noise is removed to the transistor M7 constituting the pixel amplifier. The signal TS1, which controls sampling of an optical signal as an image signal generated by irradiation with radiation, is set at high level to turn on the transistor M8. With this operation, an optical signal is collectively transferred to the capacitance CS1 as an optical signal holding capacitance via the transistor M7 constituting the pixel amplifier. The optical signal at this time is the signal acquired with high sensitivity because the signal WIDE is set at low level. At time t5, the signal TS1 is set at low level to turn off the transistor M8 so as to sample an optical signal acquired by the capacitance CS1 with high sensitivity. Sampling drive SH is performed so as to sample the signal accumulated in the capacitance Cfd in a shorter time than the period from the start of the detection of radiation to irradiation with radiation as an optical signal in a high-sensitivity mode.

The signal WIDE is then set at high level to turn on the transistor M1 as a switch element for switching the sensitivity. Turning on the transistor M1 will increase the capacitance of the floating diffusion region and change the sensitivity of the pixel from high sensitivity to low sensitivity while continuously accumulating signals corresponding to applied radiation.

At time t6, the signal EN is set at high level to turn on the transistors M3 and M6. The signal TS2 is then set at high level to turn on the transistor M11 so as to collectively transfer an optical signal acquired with low sensitivity to the capacitance CS2 as another optical signal holding capacitance via the transistor M7 constituting the pixel amplifier. At time t7, the signal TS2 is set at low level to turn off the transistor M11 so as to sample an optical signal acquired with low sensitivity in the capacitance CS2. In sampling drive SL, signals accumulated in the capacitance Cfd and capacitance Cfd1 from the start of the detection of radiation to the end of irradiation with radiation are sampled as optical signals in the low-sensitivity mode.

Subsequently, the signal PRES is set at high level to turn on the transistor M2 so as to reset the capacitances Cfd and Cfd1 to the reference voltage VRES. The signal PCL is then set at high level. This accumulates, in the capacitance Ccl, electric charges with reset noise being superimposed on the differential voltage between the voltage VCL and the voltage VRES. In addition, the signal TN is set at high level to turn on the transistor M14 so as to transfer the reference signal set at the reference voltage VCL to the capacitance CN as a reference signal holding capacitance. At time t8, the signal TN is set at low level to turn off the transistor M14 so as to sample a reference signal in the capacitance CN. The signals PRES, PCL, and EN are set at low level to finish sampling drive SL.

In order to detect radiation with high sensitivity, it is necessary to reduce the capacitance Cfd and increase the sensitivity to electric charges to be accumulated. For this reason, performing imaging under the conditions in which the dose of incident radiation is large and the accumulation time is long may result in increasing the amount of electric charges accumulated and causing saturation of the capacitance Cfd. When the capacitance Cfd saturates, the linearity of an optical signal based on the electric charges accumulated in the capacitance Cfd deteriorates, resulting in deterioration of a generated radiation image. Even when the capacitance Cfd approaches saturation, the presence of a crystal defect such as a dangling bond in an Si substrate constituting the photodiode PD or a floating diffusion region, for example, an Si substrate surface, may cause accumulated electric charges to leak from the defect. When electric charges leak, the linearity of optical signals deteriorate to result in deterioration of a radiation image.

Accordingly, this embodiment is configured to shorten the accumulation time for detecting radiation with high sensitivity as compared with the accumulation time for detecting radiation with low sensitivity. More specifically, a time TH from time t3 to time t5, which is the accumulation time for detecting radiation with high sensitivity, is made shorter than a time TL from time t3 to time t7, which is the accumulation time for detecting radiation with low sensitivity. For example, the time TH may be set to half of the time TL. After the lapse of the time TH shorter than the time from time t3 to time t6, which is the period from the start of accumulation of signals corresponding to applied radiation and the start of the detection of radiation to irradiation with radiation, accumulated electric charges are sampled with high sensitivity. Switching the sensitivity to low sensitivity afterward makes it difficult for the capacitance Cfd to saturate. This can suppress a deterioration in the linearity of optical signals caused by the saturation of the capacitance Cfd. This also makes it difficult for the capacitance Cfd to approach saturation. Consequently, even if there is a crystal defect in the Si substrate constituting the photodiode PD or the capacitance Cfd, the leakage of electric charge is suppressed, and a deterioration in linearity is suppressed. According to the experiment conducted by the present inventor, when optical signals were acquired with high sensitivity and low sensitivity while the time TL was set to 266 ms and the time TH was set to 133 ms, there was no pixel that deteriorated in linearity.

In this case, the ratio between the time TH and the time TL may be determined, as needed, based on the ratio between high sensitivity and low sensitivity. For example, when high sensitivity is five times higher than low sensitivity, the time TH may be set to ⅕ of the time TL. The time TH may be determined as needed in accordance with imaging conditions such as the intensity of radiation and the time TL set by the user or the ratio between high sensitivity and low sensitivity of the radiation imaging apparatus. For example, in setting imaging information, the system control unit 101 may include a memory storing imaging conditions including a plurality of times TH and times TL, and the time TH may be determined in accordance with the conditions set by the user.

Sampling drive SH and sampling drive SL are collectively performed in all the pixels PIX arranged in the radiation imaging apparatus 100. Subsequent sampling drives SH and SL are controlled at similar timings. After sampling drive SL, reset drive R is performed again at time t9, and the detection of radiation by the photodiode PD (the accumulation of signals corresponding to applied radiation) in the next frame starts.

High-sensitivity and low-sensitivity optical signals and a reference signal are output from each pixel PIX after sampling drive SL corresponding to the end of irradiation with radiation upon stoppage of the exposure permission signal 114 at time t6. A reference signal may be output in any of the periods of outputting (ROH) a high-sensitivity optical signal and outputting (ROL) a low-sensitivity optical signal. Turning on the analog switches M9, M12, and M15 will transfer the voltages in the capacitances CS1, CS2, and CN to the optical signal output units S1 and S2 and the reference signal output unit N via the transistors M10, M13, and M16 each constituting a pixel amplifier.

In the pixel circuit in FIG. 2, the timing of starting the accumulation of a signal corresponding to radiation in the photodiode PD is time t3 or time t10 when the signal PCL is set at low level to complete clamping after the completion of resetting shown in FIG. 3. In addition, the timing of finishing the accumulation of signals and the detection of radiation is time t7 when the signal TS2 is set at low level to sample an optical signal acquired with low sensitivity. Accordingly, the time during which electric charges are accumulated per frame is limited by inserting reset drive R between sampling drive SL and sampling drive SH for sampling optical signals and a reference signal. Referring to FIG. 3, reset drive R starting at time t9 is inserted between sampling drive SL starting at time t6 and sampling drive SH starting at time t11. This limits the irradiation time of high-sensitivity radiation as the substantial accumulation time to the time TH from time t10 to time t12 and also limits the irradiation time of low-sensitivity radiation to the time TL from time t10 to time t14.

A period during which optical signals and a reference signal can be read out from the pixel PIX is a period from the end of sampling at time t7 to time t9 when reset drive R for the next frame is started again with respect to the capacitances CS1, CS2, and CN. After the end of low-sensitivity sampling drive SL, optical signals acquired with high sensitivity and low sensitivity are output from the respective pixels PIX.

This embodiment exemplifies the case in which after imaging information and the start of imaging are set at time t1, a moving image is obtained by repeating the operation in each step from time t2 to time t9. However, this is not exhaustive. For example, a still image may be obtained by performing an operation in each step from time t1 to time t9 once.

In this embodiment, the exposure permission signal 114 from the control unit 109 is enabled to start irradiation with radiation. However, the timing of starting irradiation with radiation is not limited to this. For example, the sensor panel 105 of the radiation imaging apparatus 100 or the like may be provided with a start detection pixel for detecting the start of irradiation with radiation. In this case, each pixel PIX repeats reset drive R from time t1. In accordance with the detection of the start of irradiation with radiation by the start detection pixel, an operation for accumulating signals (electric charges) generated by incident radiation from time t3 may be started. Thereafter, sampling drive SH is performed after the lapse of the time TH shorter than the period of irradiation with radiation obtained by imaging information from the start of the accumulation of electric charges. The sensitivity of each pixel PIX is then switched to the low-sensitivity mode. In addition, the end of irradiation with radiation is detected by the start detection pixel, and sampling drive SL from time t6 may be performed in accordance with the end of irradiation with radiation.

Figure 4:
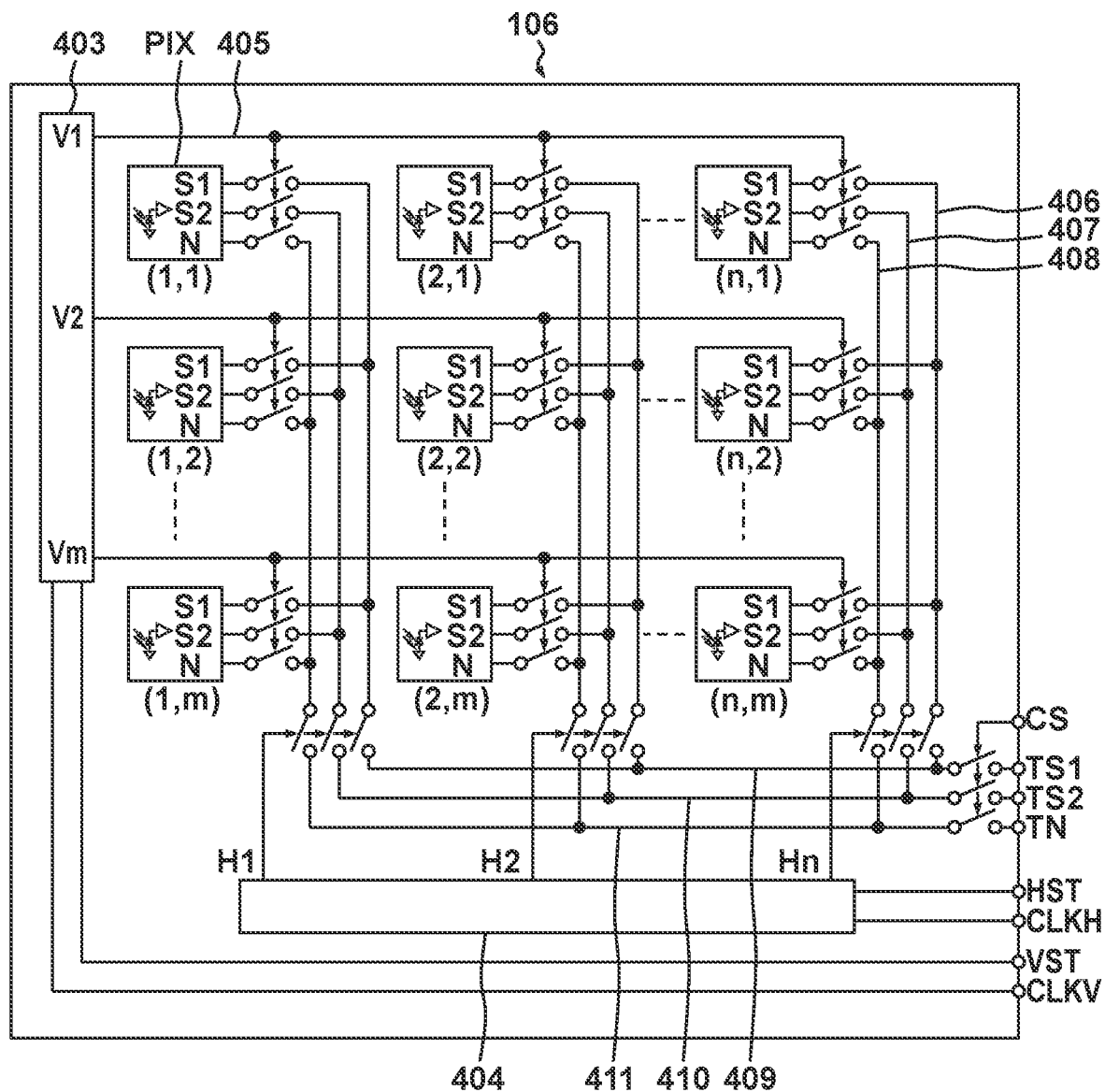
FIG. 4 is a circuit diagram showing an example of the arrangement of the sensor units of the imaging apparatus in FIG. 1.

FIG. 4 schematically shows an example of the arrangement of the internal structure of the sensor unit 106. Each sensor unit 106 includes a chip select terminal CS, an optical signal output terminal TS1, an optical signal output terminal TS2, a reference signal output terminal TN, a vertical scanning circuit start signal terminal VST, a vertical scanning circuit clock terminal CLKV, a horizontal scanning circuit start signal terminal HST, and a horizontal scanning circuit clock terminal CLKH. On each sensor unit 106, m pixels PIX and n pixels PIX are two-dimensionally arrayed in the column and row directions, respectively. A vertical scanning circuit 403 selects the pixels PIX arranged in the row direction for each row, and sequentially scans pixel groups in the vertical direction as the sub-scanning direction in synchronism with the vertical scanning clock CLKV. The vertical scanning circuit 403 can be formed from, for example, a shift register. A horizontal scanning circuit 404 sequentially selects the column signal lines of the pixels PIX in the column direction as the main scanning direction selected by the vertical scanning circuit 403 pixel by pixel in synchronism with the horizontal scanning circuit clock terminal CLKH. When a row signal line 405 connected to the vertical scanning circuit 403 is enabled, each pixel PIX outputs sampled high-sensitivity optical signal, low-sensitivity optical signal, and reference signal to column signal lines 406, 407, and 408. When the horizontal scanning circuit 404 sequentially selects signals respectively output to the column signal lines 406, 407, and 408, the respective pixels PIX sequentially output signals to analog output lines 409, 410, and 411. As described above, the sensor unit 106 selects the pixel PIX by a switching operation based on an XY address scheme using the vertical scanning circuit 403 and the horizontal scanning circuit 404. Optical signals and a reference signal from each pixel PIX are output from the optical signal output terminal TS1, the optical signal output terminal TS2, and the reference signal output terminal TN via the column signal lines 406, 407, and 408 and the analog output lines 409, 410, and 411.

Figure 5:
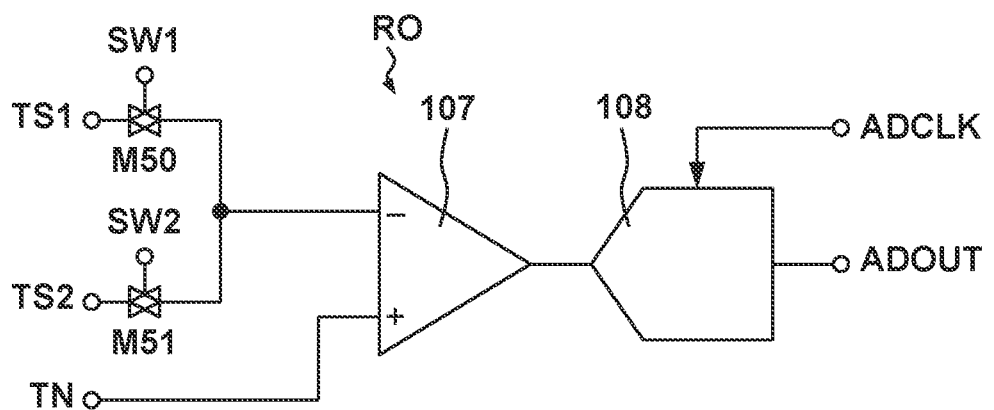
FIG. 5 is a circuit diagram showing an example of the arrangement of a readout unit of the imaging apparatus in FIG. 1.

FIG. 5 shows an example of the arrangement of the readout unit RO including the differential amplifier 107 and the A/D converter 108 which A/D-convert optical signals and a reference signal output from each pixel PIX. Outputs from the optical signal output terminals TS1 and TS2 are respectively connected to an input switch M50 and an input switch M51. The input switch M50 operates based on a signal SW1, and the input switch M51 operates based on a signal SW2. The signals SW1 and SW2 are controlled so as not be simultaneously turned on to prevent the destruction of signals output from each pixel PIX or the destruction of elements.

Even when, for example, high-sensitivity and low-sensitivity optical signals and a reference signal are simultaneously output from each pixel PIX, the signal SW1 is controlled at high level first, and the signal SW2 is then controlled at low level. Optical signals and reference signals acquired with high sensitivity from a pixel PIX (1, 1) to a pixel PIX (n, m) shown in FIG. 4 are sequentially read out. Subsequently, the signal SW1 may be controlled at low level and the signal SW2 may be controlled at high level to sequentially read out optical signals and reference signals acquired with low sensitivity from the pixel PIX (1, 1) to the pixel PIX (n, m).

In addition, for example, the signal SW1 is controlled at high level first, and the signal SW2 is then controlled at low level to sequentially read out optical signals and reference signals acquired with high sensitivity from the pixel PIX (1, 1) to a pixel PIX (n, 1). Subsequently, the signal SW1 is controlled at low level and the signal SW2 is controlled at high level to sequentially read out optical signals and reference signals acquired with low sensitivity from the pixel PIX (1, 1) to the pixel PIX (n, 1). The vertical scanning clock CLKV is supplied to the vertical scanning circuit 403 to scan one pixel in the sub-scanning direction, thereby sequentially selecting pixels from a pixel PIX (1, 2) to a pixel PIX (n, 2). The signal SW1 is controlled at high level and the signal SW2 is controlled at low level again to sequentially read out optical signals and reference signals acquired with high sensitivity from the pixel PIX (1, 2) to the pixel PIX (n, 2). Subsequently, the signal SW1 is controlled at low level and the signal SW2 is controlled at high level to sequentially read out optical signals and reference signals acquired with low sensitivity from the pixel PIX (1, 2) to the pixel PIX (n, 2). In this manner, the signals SW1 and SW2 are controlled for each row to sequentially read out signals from the pixel PIX (1, 1) to the pixel PIX (n, m).

The differential amplifier 107 receives an optical signal acquired with high or low sensitivity at the negative side input and a reference signal at the positive side input. Subtracting an optical signal from a reference signal by using the differential amplifier 107 makes it possible to remove thermal noise in the pixel amplifier in each pixel PIX, $1/f$ noise, and fixed pattern noise (FPN) caused by a temperature difference or process variations. An output from the differential amplifier 107 is input to the A/D converter 108. The A/D converter 108 receives a clock signal from a signal ADCLK, and outputs a digital optical signal ADOUT having undergone A/D conversion at the timing when the signal ADCLK is switched to high level to the control unit 109 for each sensor unit 106.

The image data interface 111 transmits the high-sensitivity and low-sensitivity optical signals ADOUT, transmitted to the control unit 109, as image data to the system control unit 101 in the order in which the data are read out by the readout unit. The system control unit 101 performs image processing for expanding the dynamic range by using the high-sensitivity and low-sensitivity optical signals ADOUT input via the image data interface 111.

Figure 6:
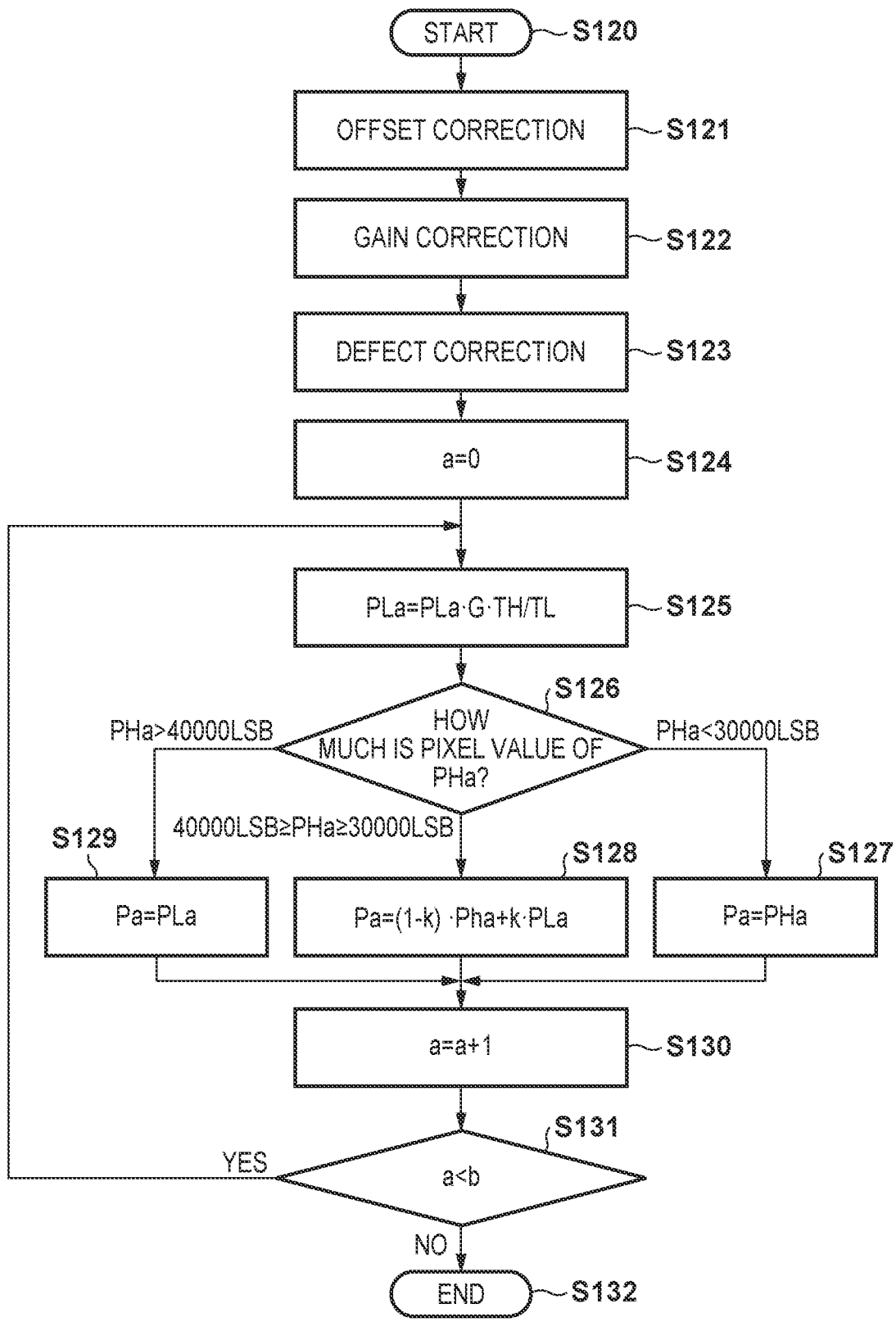
FIG. 6 is a flowchart showing an image processing method for the imaging apparatus in FIG. 1.

An image processing method for expanding a dynamic range will be described next with reference to the flowchart in FIG. 6. Upon receiving the pixel data of the optical signals ADOUT acquired with high sensitivity and low sensitivity from the radiation imaging apparatus 100, the system control unit 101 starts image processing (step S120). First of all, the characteristics of the sensor panel 105 are corrected by executing the processing of offset correction in step S121, gain correction in step S122, and defect correction in step S123. Performing the processing in steps S121 to S123 will keep the correlation between the pixel value of each pixel PIX and the pixel value of the pixel PIX provided around the pixel PIX. In addition, in this embodiment, the sensor panel 105 is constituted by the plurality of sensor units 106. Accordingly, performing the processing in steps S121 to S123 will correct characteristics between the sensor units 106.

In step S124, a variable a representing the position of a pixel in an image is initialized to 0. In the case of the sensor panel 105 having the arrangement shown in FIG. 1, a maximum value b of the variable a is given as b=n×m×7×2 because n×m pixels PIX are arrayed on each sensor unit 106.

Let PLa be the pixel value of the optical signal ADOUT acquired with low sensitivity (to be referred to as a low-sensitivity image hereinafter) when the pixel position is represented by a, and PHa be the pixel value of the optical signal ADOUT acquired with high sensitivity (to be referred to as a high-sensitivity image hereinafter). In step S125, a coefficient corresponding to the time TH and the time TL is applied to the pixel value PLa of the low-sensitivity image. More specifically, the pixel value PLa is multiplied by a coefficient (G·TH/TL) represented by a gain ratio G between a high sensitivity and a low sensitivity and a ratio TH/TL between the high-sensitivity accumulation time TH and the low-sensitivity accumulation time TL.

In step S126, methods of selecting the value of a pixel value Pa constituting a radiation image based on the pixel PIX are assigned depending on the magnitude of the pixel value PHa. of the high-sensitivity image. This embodiment exemplifies a case in which the digital optical signal ADOUT having undergone A/D conversion by the A/D converter 108 is a 16-bit (0 to 65535LBS) signal.

If the pixel value PHa of a high-sensitivity image is smaller than 30000LSB, the pixel value PHa of the high-sensitivity image is set as the pixel value Pa of the pixel PIX (step S127). In contrast, if the pixel value PHa of the high-sensitivity image is larger than 40000LSB, the pixel value PLa, of the low-sensitivity image to which the coefficient is applied in step S125 is set as the pixel value Pa of the pixel PIX (step S129). If a pixel value PHa of a high-sensitivity image is equal to or more than 30000LSB and equal to or less than 40000LSB, the pixel value PLa and the pixel value PHa are combined into the pixel value Pa of the pixel PIX. Using a predetermined weighting coefficient k, the value obtained by (1−k)·PHa+k·PLa may be set as the pixel value Pa of the pixel PIX. The coefficient k can have a value larger than 0 and less than 1.

In step S130, 1 is added to the variable a representing a pixel position. If it is determined in step S131 that the value of the variable a is smaller than the maximum value b, the process returns to step S125 to start generating the pixel value Pa at the next pixel position. If it is determined in step S131 that the value of the variable a is equal to or more than the maximum value b, the process advances to step S132 to terminate image processing.

As described above, a radiation image with an expanded dynamic range can be generated by generating the pixel value Pa based on a high-sensitivity image and a low-sensitivity image with respect to all the pixels PIX of the sensor panel 105 of the radiation imaging apparatus 100. In this embodiment, when methods of selecting the pixel value Pa are assigned, a fixed threshold is set for the pixel value PI-la. However, the threshold may be changed depending on the ratio TH/TL between the accumulation time TH and the accumulation time IL. In addition, in the embodiment, methods of selecting the pixel value Pa are assigned depending on the pixel value PHa. However, for example, the processing in step S128 may be performed for all the pixels PIX.

Figure 7:
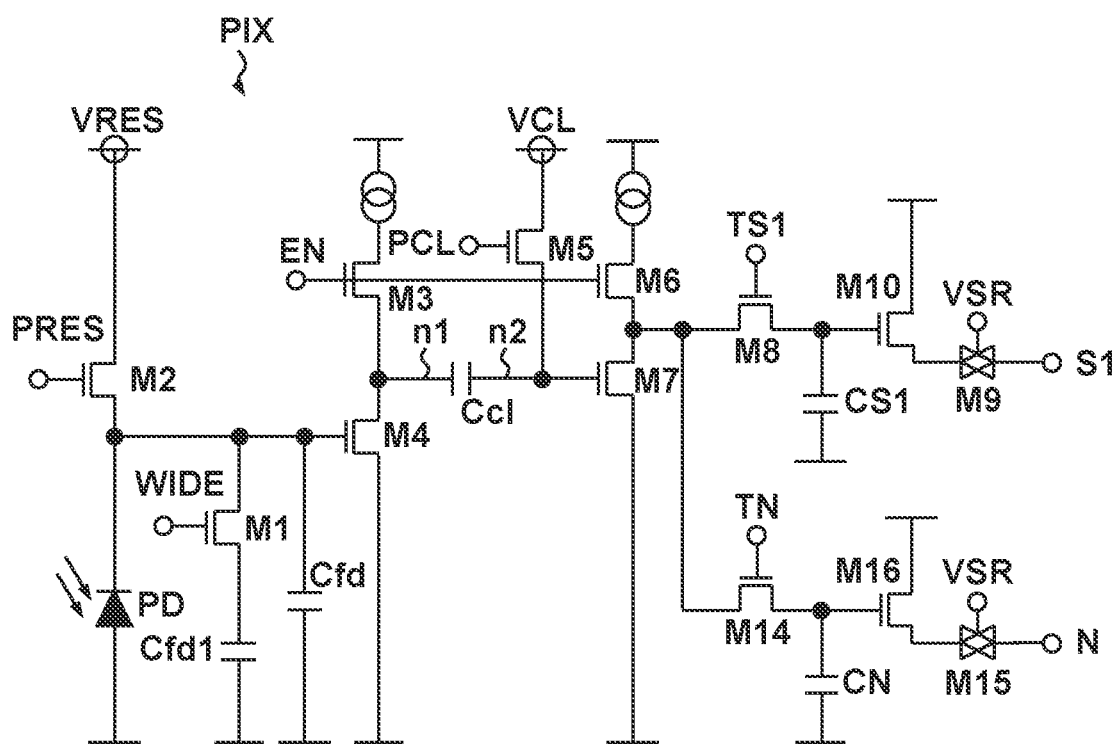
FIG. 7 is a circuit diagram showing an example of the arrangement of a pixel of the imaging apparatus in FIG. 1.

The arrangement of a radiation imaging apparatus and a drive method according to an embodiment of the present invention will be described with reference to FIGS. 7 and 8. FIG. 7 shows an example of the circuit arrangement of one pixel PIX provided in each sensor unit 106 of a sensor panel 105 according to a second embodiment of the present invention. The pixel PIX in FIG. 7 differs from the pixel PIX shown in FIG. 2 in that it includes two sample/hold circuits in a holding unit and one sample/hold circuit for accumulating optical signals. Other arrangements may be similar to those of the sensor unit 106 exemplified by the first embodiment and the like.

FIG. 8 is a timing chart showing an example of the drive operation of obtaining a moving image when there is a limitation on the irradiation time of radiation per frame at a fixed frame rate while the expansion of a dynamic range is achieved in the imaging apparatus in which the pixels PIX each shown in FIG. 7 are arranged. The timings of control signals in obtaining a moving image until electric charges are sampled in a capacitance CS1 as an optical signal holding capacitance and a capacitance CN as a reference signal holding capacitance will be described with reference to FIG. 8. The operation from time t1 to time t4 is similar to that in the first embodiment described above, and hence a description of the operation will be omitted. That is, the operation from time t4 will be described.

High-sensitivity sampling drive SH starts from time 14. At time t4, a signal EN is set at high level to turn on transistors M3 and M6. The electric charges accumulated in a capacitance Cfd are charge/voltage-converted. A transistor M4 operating as a source follower and constituting a pixel amplifier outputs the resultant voltage to a capacitance Ccl. Although the output from the transistor M4 includes reset noise, because the transistor M7 side is set at a reference voltage VCL at the time of reset drive R by the clamp circuit, the output from the transistor M4 is output as an optical signal from which reset noise is removed to the transistor M7 constituting the pixel amplifier. A signal TS1 for controlling sampling of a signal generated by irradiation with radiation is set at high level to turn on a transistor M8. This collectively transfers an optical signal to a capacitance CS1 as an optical signal holding capacitance via the transistor M7 constituting the pixel amplifier. The optical signal at this time is a signal acquired with high sensitivity because a signal WIDE is set at low level. At time t5, the signal TS1 is set at low level to turn off the transistor M8 so as to sample a high-sensitivity optical signal in the capacitance CS1.

Subsequently, the signal WIDE is set at high level to turn on a transistor M1 as a switch element for switching sensitivities. Turning on the transistor M1 will increase the capacitance of the floating diffusion region and change the sensitivity of the pixel from high sensitivity to low sensitivity. As shown in FIG. 7, because this embodiment includes only one optical signal sample/hold circuit, readout processing is performed to output optical signals acquired until low-sensitivity sampling drive SL is performed after high-sensitivity sampling drive SH is performed (ROH).

After a high-sensitivity optical signal is output from the capacitance CS1 of the optical signal sample/hold circuit, the signal EN is set at high level at time t6 to turn on the transistors M4 and M6. The signal TS1 is then set at high level to turn on the transistor M8 so as to collectively transfer a low-sensitivity optical signal to the capacitance CS1 via the transistor M7 constituting the pixel amplifier. At time t7, the signal TS1 is set at low level to turn off the transistor M8 so as to sample an optical signal with low sensitivity in the capacitance CS1.

Subsequently, a signal PRES is set at high level to turn on a transistor M2 so as to reset capacitances Cfd and Cfd1 to a reference voltage VRES. A signal PCL is then set at high level. This accumulates, in the capacitance Ccl, electric charges with reset noise being superimposed on the differential voltage between the voltage VCL and the voltage VRES. In addition, a signal TN is set at high level to turn on a transistor M14 so as to transfer the reference signal set at the reference voltage VCL to a capacitance CN as a reference signal holding capacitance. At time t8, the signal TN is set at low level to turn off the transistor M14 so as to sample a reference signal in the capacitance CN. The signals PRES, PCL, and EN are set at low level to finish sampling drive SL. After the low-sensitivity sampling drive SL, the readout processing of outputting the sampled low-sensitivity optical signals is performed (ROL). In the period (ROL) during which low-sensitivity optical signals are output, a reference signal is also output.

In this embodiment as well, a time TH from time t3 to time t5, which is the accumulation time for detecting radiation with high sensitivity is shorter than a time TL from time t3 to time t7, which is the accumulation time for detecting radiation with low sensitivity. After the lapse of the time TH shorter than the time from time t3 to time t6, which is the period from the start of accumulation of electric charges and the execution of irradiation with radiation, accumulated electric charges are sampled with high sensitivity, and the sensitivity is switched to low sensitivity. This makes it difficult for the capacitance Cfd to saturate. With this operation, similar effect to that of the first embodiment described above can be obtained. According to the experiment conducted by the present inventor, when optical signals were acquired with high sensitivity and low sensitivity while the time TL was set to 266 ms and the time TH was set to 133 ms, there was no pixel that deteriorated in linearity.

Sampling drive SH and sampling drive SL are collectively performed in all pixels PIX arranged in a radiation imaging apparatus 100. Subsequent sampling drives SH and SL are controlled at similar timings. After sampling drive SL, reset drive R is performed again at time t9, and the detection of radiation by the photodiode PD in the next frame starts.

Each optical signal and a reference signal are scanned for each pixel PIX. Turning on analog switches M9 and M15 will transfer the voltages in the capacitances CS1 and CN to an optical signal output unit S1 and a reference signal output unit N via transistors M10 and M16 each constituting a pixel amplifier.

In the pixel circuit in FIG. 7, the timing of starting the accumulation of a signal in the photodiode PD is time t3 or time t10 when the signal PCL is set at low level to complete clamping after the completion of resetting shown in FIG. 8. In addition, the timing of finishing the accumulation is time t7 when the signal TS1 out of the period of the signal TS1 is set at low level to sample an optical signal acquired with low sensitivity. Accordingly, the accumulation time per frame is limited by inserting reset drive R between sampling drive SL and sampling drive SH for sampling an optical signal and a reference signal. Referring to FIG. 8, reset drive R starting at time t9 is inserted between sampling drive SL starting at time t6 and sampling drive SH starting at time t11. This limits the irradiation time of high-sensitivity radiation as the substantial accumulation time to the time TH from time t10 to time t12 and also limits the irradiation time of low-sensitivity radiation to the time TL from time t10 to time t14.

A period during which an optical signal and a reference signal can be read out from the pixel PIX is a period from the end of sampling at time t5 to time t6 when a low-sensitivity optical signal is sampled by sampling drive SL in the capacitance CS1. A period during which a low-sensitivity optical signal and a reference signal can be read out is a period from the end of sampling at time t7 to time t9 when reset drive R for the next frame is started again with respect to the capacitance CS1 and CN.

A drive method for a radiation imaging apparatus according to an embodiment of the present invention will be described with reference to FIG. 9. FIG. 9 is a timing chart showing an example of a drive operation of obtaining a moving image, when the dynamic range is to be expanded and there is a limitation on the irradiation time of radiation per frame at a fixed frame rate in a third embodiment of the present invention. The arrangements of the radiation imaging apparatus and each pixel PIX are similar to those in the first embodiment described above.

In the first and second embodiments described above, the signal WIDE is shifted to high level once after reset drive R to switch the pixel PIX from high sensitivity to low sensitivity so as to perform low-sensitivity sampling. It is known, however, that when a transistor M1 for switching the sensitivity operates to turn on and off the switch, a phenomenon called charge injection can cause electric charges to be injected or discharged from the signal WIDE. That is, shifting the signal WIDE to high level after reset drive R can cause electric charges to be injected from the signal WIDE. For this reason, the low-sensitivity optical signal to be sampled can be offset. When the present inventor conducted an experiment, a high-sensitivity optical signal ADOUT read out by an A/D converter 108 without irradiation with radiation was about 8000LSB. In contrast to this, the low-sensitivity optical signal ADOUT read out after the operation of the transistor M1 was about 10000LSB, which was increased by about 2000LSB. When the resolution of the A/D converter 108 is 16 bits, the output range of the A/D converter 108 is 0 to 65535LSB. In general, in consideration of various types of variations, the range from a state of no irradiation with radiation to a state of irradiation with radiation with the highest intensity is expressed by a range of about 50000LSB of the output range of the A/D converter 108. This indicates that the dynamic range of a low-sensitivity image narrows by about 2000LSB.

FIG. 9 is a timing chart showing an example of drive control for preventing the dynamic range of a low-sensitivity image from narrowing due to this charge injection. The timings of control signals will be described with reference to FIG. 9, in obtaining a moving image, until electric charges are sampled in capacitances CS1 and CS2 as optical signal holding capacitances and a capacitance CN as a reference signal holding capacitance. An operation from time t1 to time t5 is similar to that in the first embodiment, and hence a description of the operation will be omitted. An operation from time t5 will be described.

After a high-sensitivity optical signal is sampled in the capacitance CS1 by sampling drive SH, the signal WIDE is set at high level at time t5 to turn on the transistor M1 as a switch element for switching sensitivities. Turning on the transistor M1 will increase the capacitance of a floating diffusion region and change the sensitivity of the pixel from a high sensitivity mode to a low sensitivity mode.

At time t6, a signal EN is set at high level to turn on transistors M3 and M6. The signal WIDE is then set at low level to turn off the transistor M1 as a switch element for switching the sensitivity. With this operation, electric charges are discharged from the signal WIDE. That is, when the signal WIDE is set at high level at time t5 to turn on the transistor M1, the electric charges injected from the signal WIDE are discharged at time t6, thereby correcting the voltage level of the low-sensitivity optical signal.

A signal TS2 is set at high level to turn on a transistor M11 so as to collectively transfer the optical signal acquired with low sensitivity to the capacitance CS2 as an optical signal holding capacitance via a transistor M7 constituting a pixel amplifier. At time t7, the signal TS2 is set at low level to turn off the transistor M11 so as to sample the optical signal acquired with low sensitivity in the capacitance CS2.

Subsequently, a signal PRES is set at high level to turn on a transistor M2 so as to reset capacitances Cfd and Cfd1 to a reference voltage VRES. A signal PCL is set at high level. This accumulates, in the capacitance Ccl, electric charges with reset noise being superimposed on the differential voltage between a voltage VCL and the voltage VRES. In addition, a signal TN is set at high level to turn on a transistor M14 so as to transfer the reference signal set at the reference voltage VCL to the capacitance CN as a reference signal holding capacitance. At time t8, the signal TN is set at low level to turn off the transistor M14 so as to sample a reference signal in the capacitance CN. The signals PRES, PCL, and EN are set at low level to finish sampling drive SL. High-sensitivity and low-sensitivity optical signals and a reference signal are output from each pixel PIX after the end of sampling drive SL as in the first embodiment described above.

According to an experiment, when the transistor M1 is turned off before sampling of a low-sensitivity optical signal, the high-sensitivity optical signal ADOUT without irradiation with radiation was about 8000LSB, and the low-sensitivity optical signal ADOUT was also about 8000LSB, which was equal to the high-sensitivity optical signal ADOUT. Using the drive method according to this embodiment makes it possible for low-sensitivity digital image data to have a dynamic range similar to that of high-sensitivity digital image data. In the embodiment as well, accumulated electric charges are sampled with high sensitivity after the lapse of the time TH shorter than the period of irradiation with radiation since the start of the accumulation of electric charges, and the sensitivity is switched to low sensitivity, thereby making it difficult for the capacitance Cfd to saturate. This makes it possible to obtain similar effect to that of the first embodiment.

Although the three embodiments of the present invention have been described above, it is obvious that the present invention is not limited to these embodiments. The above embodiments can be changed and combined as needed without departing from the scope of the present invention.

For example, each of the above embodiments has been described by using the pixel PIX including one or two sample/hold circuits for optical signals. However, each pixel PIX may include three or more sample/hold circuits for optical signals. In this case, this arrangement may be provided with two or more additional capacitances for switching sensitivities and two or more switch elements such as transistors provided between the photodiodes PD and the additional capacitances.

In this embodiment, for example, setting a short radiation accumulation time will suppress the occurrence of a pixel that deteriorates in linearity. For this reason, the accumulation time TH for high sensitivity may be set to be equal to the accumulation time TL for low sensitivity.

In this embodiment, pixel values used for a radiation image are generated based on the ratio between the accumulation time TH for high sensitivity and the accumulation time TL for low sensitivity. However, this is not exhaustive. For example, pixel values may be generated by using coefficients corresponding to ratios between the effective doses of radiation acquired from high-sensitivity optical signals and the effective doses of radiation acquired from low-sensitivity optical signals. This also makes it possible to generate pixel values with high accuracy.

The present invention is not limited to the above-described embodiments, and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The above means provide a technique advantageous in expanding a dynamic range in a radiation imaging apparatus.

The invention claimed is:

1. A radiation imaging apparatus, comprising:
a plurality of pixels configured to detect radiation with a first sensitivity and a second sensitivity lower than the first sensitivity;
each of the pixels including a conversion element configured to generate an electric charge corresponding to applied radiation, a capacitance configured to accumulate the electric charge generated by the conversion element, and an additional capacitance connected to the conversion element via a switch element, wherein each of the pixels is configured to
operate with the first sensitivity by turning off the switch element, and operates with the second sensitivity by turning on the switch element,
start an operation for accumulating a signal corresponding to applied radiation with the first sensitivity in accordance with a start of irradiation of the radiation imaging apparatus, then
sample an accumulated signal as a first signal accumulated from a start of the operation for accumulating the signal corresponding to applied irradiation until lapse of a first time, which is shorter than a period of irradiation, then
switch to the second sensitivity by turning on the switch element, and accumulates a signal corresponding to applied radiation, then
sample an accumulated signal as a second signal after turning off the switch element, in accordance with an end of irradiation of the radiation imaging apparatus, and then
output the first signal and the second signal to generate a radiation image based on the first signal and the second signal.

2. The radiation imaging apparatus according to claim 1, further comprising a processing unit, wherein
each of the plurality of pixels is configured to output the first signal and the second signal to the processing unit, and
the processing unit is configured to generate the radiation image based on the first signal and the second signal.

3. The radiation imaging apparatus according to claim 2, wherein the processing unit is configured to apply a coefficient corresponding to a time from a start of an operation for accumulating a signal to sampling of the first signal and a time from a start of an operation for accumulating a signal to sampling of the second signal to at least one of the first signal and the second signal, and to generate the radiation image based on the first signal and the second signal to at least one of which the coefficient is applied.

4. The radiation imaging apparatus according to claim 2, wherein the processing unit is configured to apply a coefficient corresponding to a time from a start of an operation for accumulating a signal to sampling of the first signal and a time from a start of an operation for accumulating a signal to sampling of the second signal to the second signal,
to generate the radiation image based on the first signal if a magnitude of the first signal is smaller than a first magnitude,
to generate the radiation image based on the second signal to which the coefficient is applied if the magnitude of the first signal is smaller than a second magnitude smaller than the first magnitude, and
to generate the radiation image based on the first signal and the second signal to which the coefficient is applied if the magnitude of the first signal is not more than the first magnitude and not less than the second magnitude.

5. The radiation imaging apparatus according to claim 2, wherein the processing unit is configured to apply a coefficient corresponding to an effective dose of radiation acquired from the first signal and an effective dose of radiation acquired from the second signal to at least one of the first signal and the second signal and to generate the radiation image based on the first signal and the second signal to at least one of which the coefficient is applied.

6. The radiation imaging apparatus according to claim 1, wherein each of the plurality of pixels is configured to output the first signal and the second signal after sampling the second signal.

7. The radiation imaging apparatus according to claim 1, wherein each of the plurality of pixels is configured to output the first signal after sampling of the first signal during sampling of the second signal, and to output the second signal after sampling the second signal.

8. The radiation imaging apparatus according to claim 1, wherein the first time is determined in accordance with imaging information set by a user.

9. A radiation imaging system comprising the radiation imaging apparatus according to claim 1; and a radiation generator configured to generate radiation.

10. A drive method for a radiation imaging apparatus including a plurality of pixels configured to detect radiation with a first sensitivity and a second sensitivity lower than the first sensitivity, each of the plurality of pixels including a conversion element configured to generate an electric charge corresponding to applied radiation, a capacitance configured to accumulate the electric charge generated by the conversion element, and an additional capacitance connected to the conversion element via a switch element, comprising the steps of:

a first step of starting an operation for accumulating a signal corresponding to applied radiation in each of the plurality of pixels with the first sensitivity in accordance with a start of irradiation of the radiation imaging apparatus;

a second step of sampling a signal accumulated in each of the plurality of pixels as a first signal after lapse of a first time shorter than a period of irradiation since a start of the operation for accumulating the signal corresponding to applied radiation;

a third step of switching each of the plurality of pixels to the second sensitivity by turning on the switch element, and accumulating a signal corresponding to applied radiation;

a fourth step of sampling a signal accumulated in each of the plurality of pixels as a second signal after turning off the switch element, in accordance with an end of irradiation of the radiation imaging apparatus; and a fifth step of outputting the first signal and the second signal from each of the plurality of pixels to generate a radiation image based on the first signal and the second signal.

11. The drive method according to claim 10, wherein a moving image is obtained by repeating the first step, the second step, the third step, the fourth step and the fifth step in that order.

12. A non-transitory computer-readable storage medium storing a program for causing a computer to execute a drive method for a radiation imaging apparatus including a plurality of pixels configured to detect radiation with a first sensitivity and a second sensitivity lower than the first sensitivity, each of the plurality of pixels includes a conversion element configured to generate an electric charge corresponding to applied radiation, a capacitance configured to accumulate the electric charge generated by the conversion element, and an additional capacitance connected to the conversion element via a switch element, comprising:

a first step of starting an operation for accumulating a signal corresponding to applied radiation in each of the plurality of pixels with the first sensitivity in accordance with a start of irradiation of the radiation imaging apparatus;

a second step of sampling a signal accumulated in each of the plurality of pixels as a first signal after lapse of a first time shorter than a period of irradiation since a start of the operation for accumulating the signal corresponding to applied radiation;

a third step of switching each of the plurality of pixels to the second sensitivity by turning on the switch element, and accumulating a signal corresponding to applied radiation;

a fourth step of sampling a signal accumulated in each of the plurality of pixels as a second signal after turning off the switch element, in accordance with an end of irradiation of the radiation imaging apparatus; and a fifth step of outputting the first signal and the second signal from each of the plurality of pixels to generate a radiation image based on the first signal and the second signal.

* * * * *